(12) United States Patent
Kamata

(10) Patent No.: US 7,099,235 B2
(45) Date of Patent: Aug. 29, 2006

(54) GEOPHONE AND METHOD OF MANUFACTURING A GEOPHONE

(75) Inventor: Masahiro Kamata, Kawasaki (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 561 days.

(21) Appl. No.: 10/344,473

(22) PCT Filed: Aug. 23, 2001

(86) PCT No.: PCT/IB01/01559

§ 371 (c)(1),
(2), (4) Date: Feb. 12, 2003

(87) PCT Pub. No.: WO02/18975

PCT Pub. Date: Mar. 7, 2002

(65) Prior Publication Data

US 2003/0179103 A1 Sep. 25, 2003

(30) Foreign Application Priority Data

Sep. 1, 2000 (GB) ................................ 0021408.8

(51) Int. Cl.
*H04R 9/00* (2006.01)
(52) U.S. Cl. .................. 367/182; 367/183; 702/14; 137/82
(58) Field of Classification Search .............. 367/182, 367/183, 185; 137/82, 84; 702/14; 73/654
See application file for complete search history.

(56) References Cited

U.S. PATENT DOCUMENTS

| | | | |
|---|---|---|---|
| 2,651,769 A | 9/1953 | Stafford | |
| 2,748,370 A | 5/1956 | Baltosser | |
| 3,635,411 A | 1/1972 | Petrinjak | |
| 3,863,200 A | 1/1975 | Miller | |
| 3,890,606 A * | 6/1975 | Florian et al. ............... | 367/183 |
| 4,159,464 A | 6/1979 | Hall, Jr. | |
| 4,225,756 A | 9/1980 | Babb | |
| 4,623,991 A | 11/1986 | Vitringa | |
| 5,469,408 A * | 11/1995 | Woo ........................... | 367/182 |
| 5,785,272 A * | 7/1998 | Slade et al. ............... | 242/532.5 |

FOREIGN PATENT DOCUMENTS

| | | |
|---|---|---|
| EP | 0896228 | 2/1999 |
| GB | 0381803 | 10/1932 |
| GB | 1499821 | 2/1978 |
| GB | 1508348 | 4/1978 |
| GB | 1604933 | 12/1981 |
| GB | 2297218 | 7/1996 |
| GB | 2319621 | 5/1998 |
| JP | 3098045 | 10/2000 |
| NL | 8303652 | 5/1984 |

* cited by examiner

*Primary Examiner*—Timothy Edwards, Jr.
(74) *Attorney, Agent, or Firm*—Karan Singh; William Batzer; Dale Gaudier

(57) ABSTRACT

A vibration transducer such as a geophone, comprising a central pole piece (110) with a magnet (112) and coil (118) concentrically arranged around it. The position of the magnet (112) is fixed relative to the pole piece (110) and the coil (118) is movable relative to the magnet (112). A method of manufacturing a vibration transducer is characterised in that a bobbin carrying the coils is formed from a substantially tubular body which is positioned on a mandrel and at least one coil is wound around its outer surface, the mandrel being removed from the bobbin when the coil is complete. Another method is characterised in that the coil is formed separately and the bobbin is formed from a substantially tubular body which is positioned inside the coil and expanded to contact the coil when in position.

30 Claims, 9 Drawing Sheets

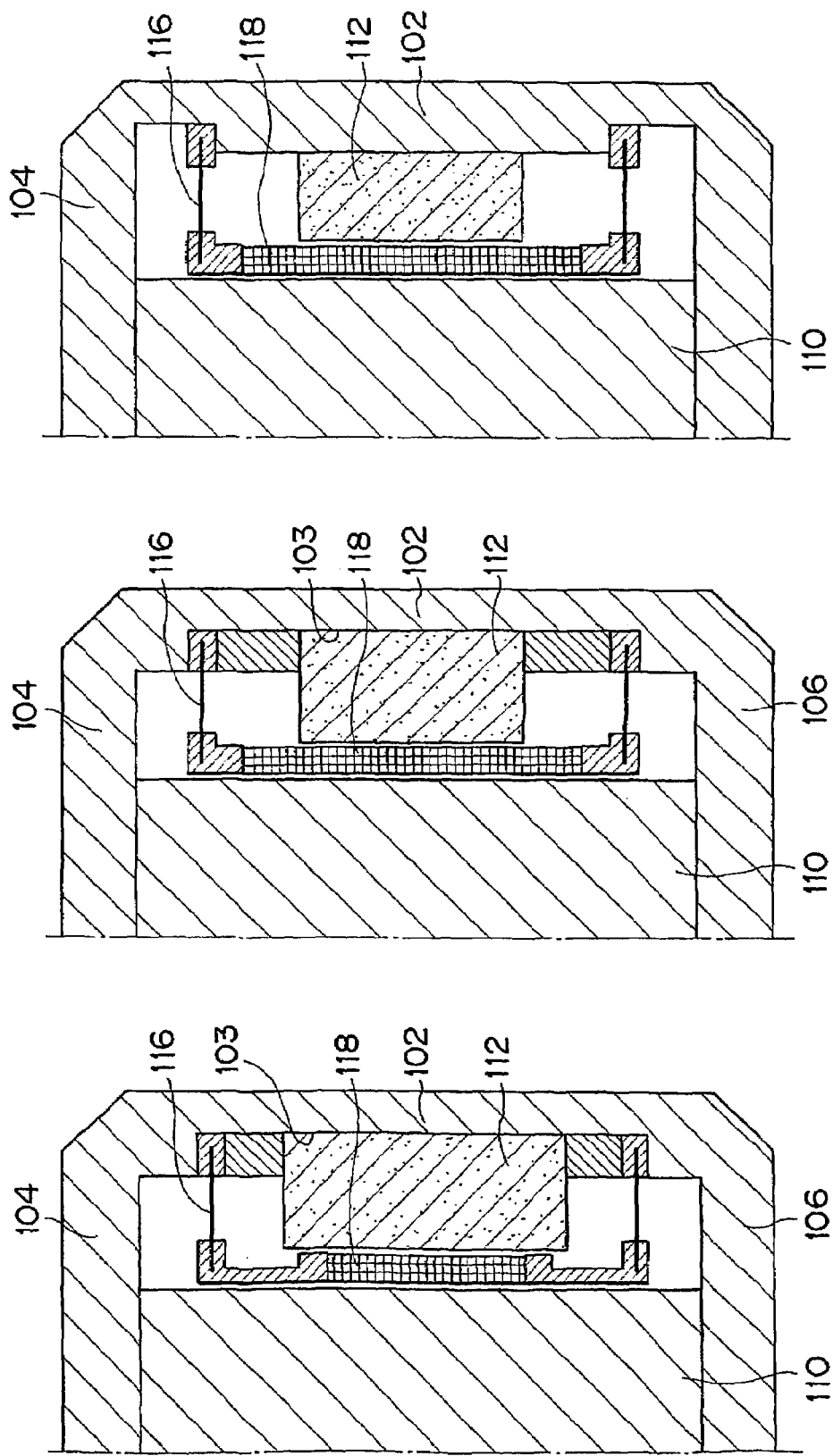

F I G. 14
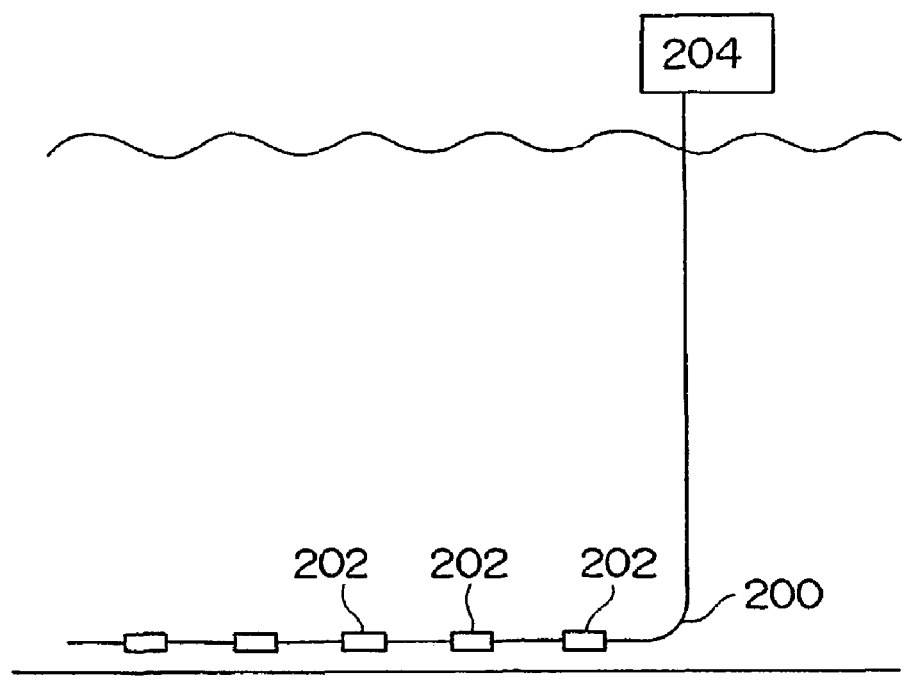
F I G. 15
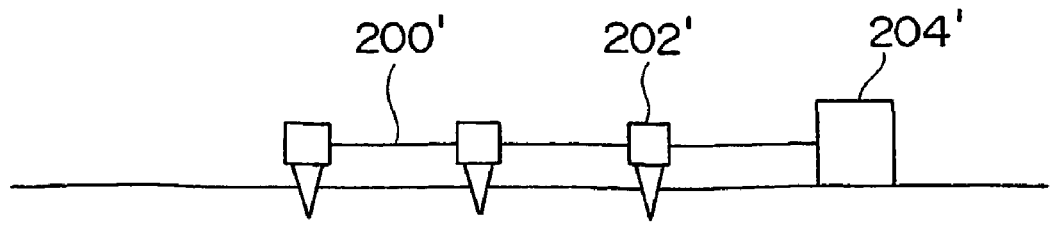

GEOPHONE AND METHOD OF MANUFACTURING A GEOPHONE

FIELD OF THE INVENTION

The present invention relates to geophones, devices for sensing vibrations in earth formations. The invention may be applicable to other types of vibration transducers, either in sensing or transmitting operation.

BACKGROUND AND PRIOR ART

In seismic exploration, the vibrations in the earth resulting from a source of seismic energy are sensed at discrete locations by sensors and the output of the sensors used to determine the nature of the underground formations. The source of seismic energy can be natural, such as earthquakes and other tectonic activity, subsidence, volcanic activity or the like, or man-made such as acoustic noise from surface or underground operations, or from deliberate operation of seismic sources at the surface or underground. Sensors fall into two main categories; hydrophones which sense the pressure field resulting from a seismic source, or geophones which sense vibration arising from a seismic source.

A prior art form of geophone is shown in FIG. 1. The geophone 10 consists of a moving coils 12, 13 mounted on a bobbin 14, a magnet 15, a pair of pole pieces 16, 18 with suspension springs 20, 22 and a housing 24 as shown in FIG. 1. The pole pieces 16, 18 and housing 24 are made of magnetically permeable material and form a magnetic field in which the moving coils 12, 13 are suspended.

When the earth moves due to the seismic energy propagating either directly from the source or via an underground reflector, the geophone, which can be located at the earth's surface or on the wall of a borehole which penetrates the earth, moves in the direction of propagation of the energy. If the axis of the geophone is aligned with the direction of motion, however, the moving coils mounted on the springs inside the geophone stay in the same position causing relative motion of the coils with respect to the housing. When the coils move in the magnetic field, a voltage is induced in the coils which can be output as a signal. The response of a geophone is frequency dependent and can be expressed as $$e_g = \frac{Bl\left(\frac{\omega}{\omega_0}\right)^2}{\sqrt{\left\{1-\left(\frac{\omega}{\omega_0}\right)^2\right\}+\left(2\zeta\frac{\omega}{\omega_0}\right)^2}}$$

$$\tan(\varphi) = \frac{1-\left(\frac{\omega}{\omega_0}\right)^2}{2\zeta\frac{\omega}{\omega_0}}$$

$$\omega_0 = \sqrt{\frac{k}{m}}$$

Where
$e_g$: induced voltage
B: magnetic flux density
l: length of the moving coil
$\omega$: velocity of motion
$\omega_0$: natural frequency
k: spring constant
m: moving mass
$\zeta$: damping factor The internal damping is usually designed to be low and the total damping factor is adjusted by the use of a shunt resister externally attached and the factor is usually set to be about 70%.

One problem encountered with this design is how to increase sensitivity without dramatically increasing the size of the sensor, especially its diameter when considering use as a borehole sensor. Most prior art geophones use alnico magnets. To increase the sensitivity, a better magnetic material is needed. It is know that rare earth cobalt and/or neodimium iron boron (neogium) magnets produce larger magnetic flux than alnico; however, they have different characteristics and to obtain optimum flux density, the shapes of magnets need to be different for the different materials. A suitable shape for an alnico magnet is a relatively tall cylinder, whereas a rare earth cobalt magnet is preferably a relatively flat disc. To overcome the shape problem, a dynamic accelerometer was proposed as described in Japanese Patent Application No. 2-419184 and shown in FIG. 2. Flat, rare earth cobalt magnets 30, 32 are mounted face-to-face on a yoke 34 connected to the sensor housing 36 to achieve large flux density. A centre pole piece 38 is located in the space between the opposed magnets 30, 32 and a moving coil 40 is mounted on springs 42, 44 around the central pole piece 38. In this design, the natural frequency was chosen to be in the middle of the seismic frequency band and large damping is achieved by using imaginary short circuit connected across the coil output "40" of an operational amplifier 50 with appropriate resistors $R_1$, $R_2$ as shown in FIG. 3. While it is possible to attain a suitable size for such a sensor, the assembly cost has proved to be high.

Another problem with the prior art design of FIG. 1 is that the bobbin 14 should preferably be as light as possible. However, in the past this bobbin has been machined from metal which has proven both expensive and difficult to achieve the small thickness desired for size and mass limitations.

SUMMARY OF THE INVENTION

A first aspect of the invention comprises a novel vibration transducer design which finds particular utility as a geophone for seismic measurments. The transducer according to this aspect of the invention has a central pole piece with a magnet and coil concentrically arranged around it. The position of the magnet is fixed relative to the pole piece and the coil is movable relative to the magnet.

In accordance with one embodiment of the first aspect of the invention, there is provided a vibration transducer, comprising a housing; a central pole piece located inside the housing; a magnet mounted on an inner surface of the housing so as to extend around the pole piece; and a coil located between the magnet and the pole piece and resiliently mounted with respect to the magnet.

In accordance with a second embodiment of the first aspect of the invention, there is provided a vibration transducer comprising a housing, a central pole piece located inside the housing, a magnet mounted on an outer surface of the pole piece so as to extend substantially completely around the pole piece, and a coil located between the magnet and the housing and resiliently mounted with respect to the magnet.

The transducer preferably has a circular cross-section with the pole piece at the centre and the housing, magnet, and coil in a concentric arrangement around the pole piece.

The housing can be formed from a wall section closed at either end by end caps so as to define a cavity. The pole piece can be attached to the end caps and extend through the cavity. Any suitable material such ass steel or soft iron can be used for these parts. One or other end cap can be formed integrally with the housing. The pole piece can also be formed integrally with an end cap. The end caps can fit over the end of the housing or inside an open end of the housing.

Any suitable magnetic material can be used although rare earth-cobalt (e.g. $(Sm.Pr)Co_5$) or neodimium-iron-boron (e.g. $Nd_2Fe_{14}B$) materials are preferred for magnetic properties and ferrite for its low cost. The magnet is polarised in the radial direction for optimum effect. While the magnet can be formed as a single piece, it is also possible for it to be formed from a number of discrete components which are either connected to the housing to encircle the coil and pole piece, or connected around the pole piece itself.

The coil is preferably mounted on a bobbin. In one embodiment, the bobbin is connected to the magnet by means of springs although other resilient mounting arrangements can be used. The mounting preferably allows freedom of movement in the axial direction for the bobbin and hence the coils.

Modification of the natural frequency of the transducer may be required. This can be achieved electronically, for example by use of an imaginary short, or operational amplifier and shunt resister arrangement.

A second aspect of the invention provides a method of manufacturing a vibration transducer which comprises a housing having a central magnet structure disposed therein and a bobbin and coil structure disposed around the central magnet structure and resiliently mounted relative to the housing and central magnet structure, the method characterised in that the bobbin is formed from a substantially tubular body which is positioned on a mandrel and at least one coil is wound around its outer surface, the mandrel being removed from the bobbin when the coil is complete.

The bobbin can be formed either from a complete tube, such as an extruded or welded tube, or a flat sheet formed into a tube shape without welding or the like. The mandrel can be inserted into the bobbin and expanded to support the bobbin while the coil is wound.

A third aspect of the invention provides a further method of manufacturing a vibration transducer which comprises a housing having a central magnet structure disposed therein and a bobbin and coil structure disposed around the central magnet structure and resiliently mounted relative to the housing and central magnet structure, the method characterised in that the coil is formed separately and the bobbin is formed from a substantially tubular body which is positioned inside the coil and expanded to contact the coil when in position.

Both methods of manufacturing allow the use of light and thing materials which improves the sensitivity of the resulting transducer. Also, an expensive machining step is avoided which allows dramatic cost reduction in the manufacturing of the transducer.

BRIEF DESCRIPTION OF THE DRAWINGS

FIGS. 7a–7C show alternative arrangements of coil and magnet mountings in the housing;
FIG. 14 shows a sea bed cable;
FIG. 15 shows a land cable.

DESCRIPTION OF THE PREFERRED EMBODIMENTS

Figure 4:
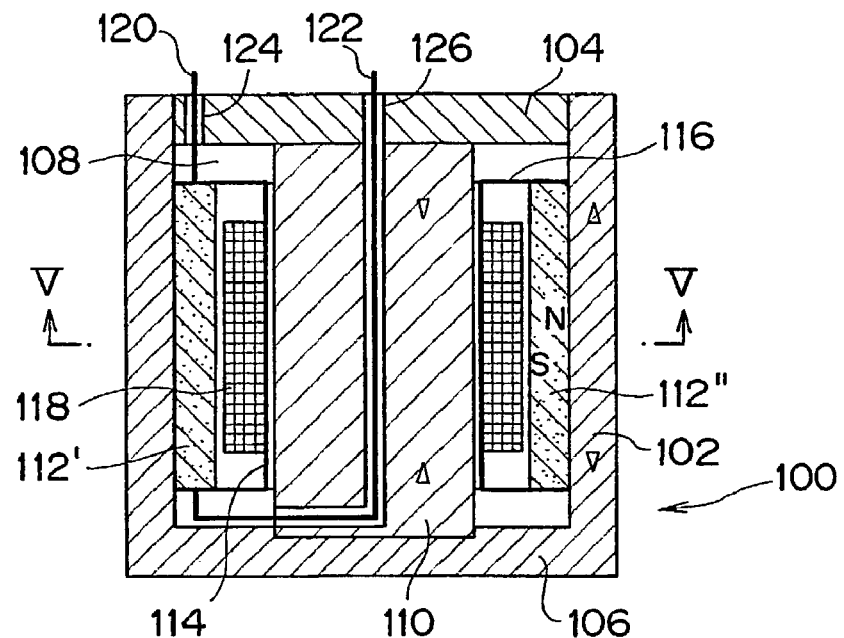
FIG. 4 shows a scematic view of a geophone according to an embodiment of the invention.
Figure 5:
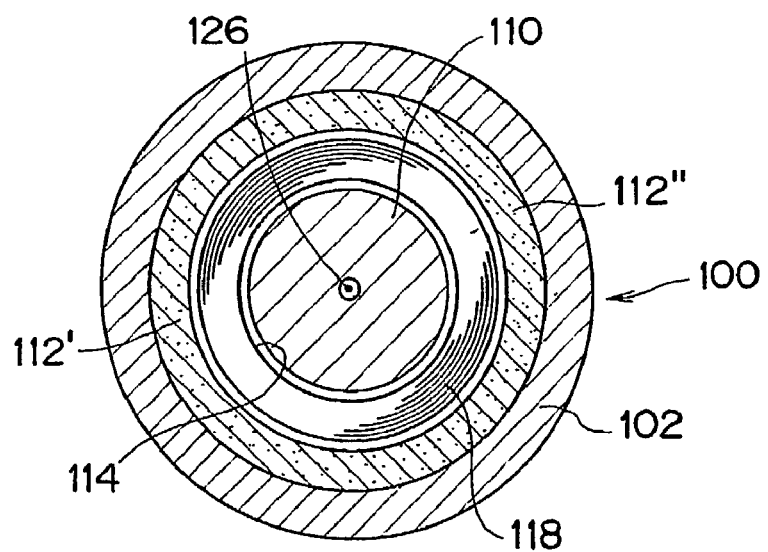
FIG. 5 shows a view on AA of FIG. 4.
Figure 6A:
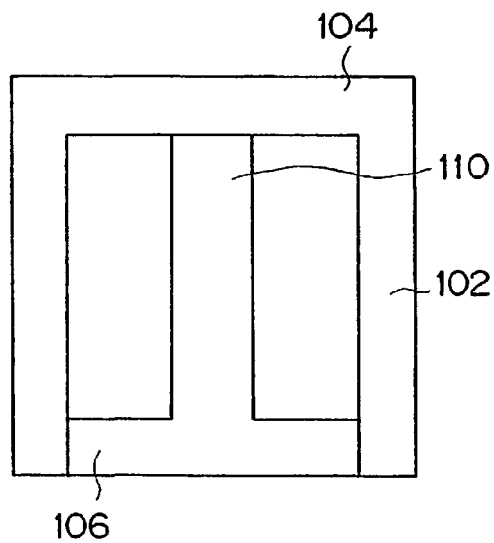
FIGS. 6a–6d show alternative constructions for the housing and pole piece assembly.
Figure 6B:
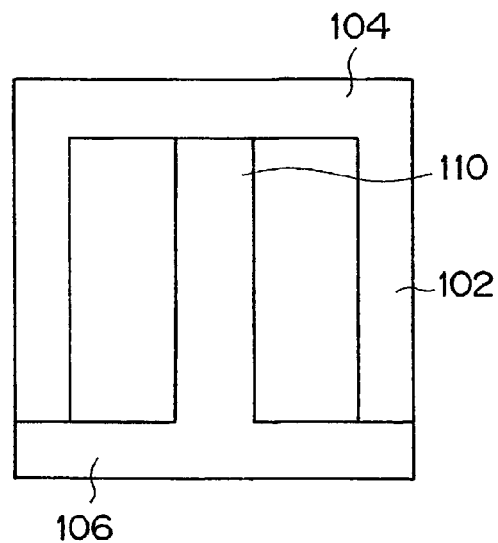
Figure 6C:
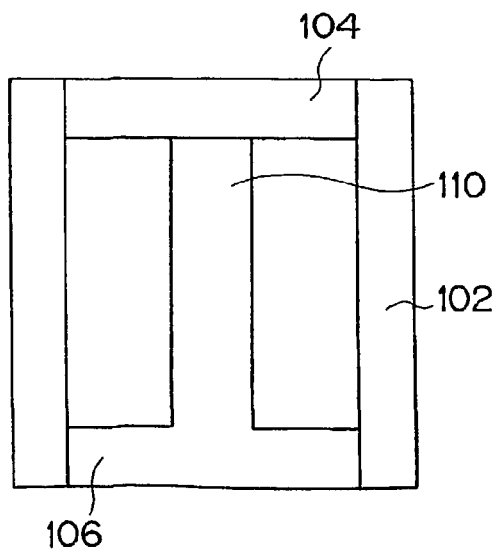
Figure 6D:
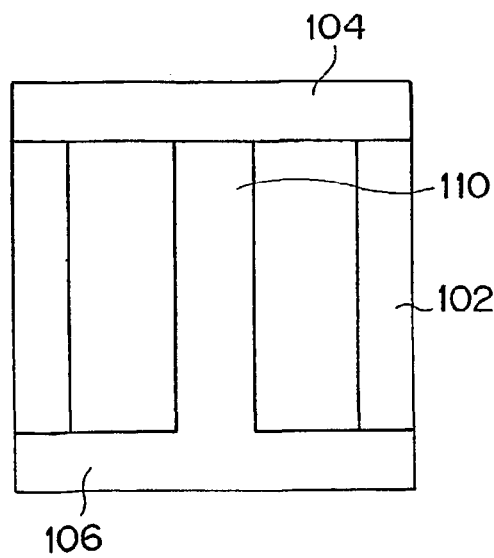

A geophone suitable for use in seismic surveying and embodying the present invention is shown in FIGS. 4 and 5. The geophone 100 comprises a hollow, tubular housing 102 formed from steel having its ends closed by steel end caps 104, 106 so as to form a cavity 108 inside the housing 102. A cylindrical steel centre pole piece 110 extends between the end caps 104, 106 through the cavity 108. In the embodiment shown in FIG. 4, one end cap 106 is integrally formed with the housing 102 and the other end cap 104 fits inside the upper part of the housing 102 to define the cavity. The pole piece 110 is formed separately from the end caps 104, 106, but is connected to them when the geophone is assembled. Various constructions of housing 102, end caps 104, 106 and pole piece 110 are shown in FIGS. 6a–d. Where an end cap 104 is integral with the housing 102 the pole piece 110 can be formed integrally with the other end cap 106 (FIGS. 6a and 6b). The end caps 104, 106 can also be formed separately from the housing 102 and connected either over the ends of the housing 102 (FIG. 6d) or inside the open end of the housing 102 (FIG. 6c) in a similar way to the single end caps 106 shown in FIGS. 6a and 6b. Again, the pole piece 110 can be integral with one or other end cap.

A tubular magnet 112 is fixed to the inside of the housing 102 in the cavity 108. The magnet 112 is formed from a number of discrete pieces 112', 112" (two are shown here although other numbers may be appropriate). Alternatively a single piece magnet could be used. Whichever construction is selected, the direction of polarisation of the magnet 112 should be in the radial direction of the geophone (indicated by NS in FIG. 4).

The magnet is preferably made of neogium ($Nd_2Fe_{14}B$) but other materials such as rare earth cobalt magnetic materials can be used. Since materials such as these can have differing properties, especially with regard to temperature, the most suitable material may differ from application to application. Manufacturers of such materials provide indications of induction, demagnetising force, energy product and permanence coefficient for their products and these properties should be consulted when selecting a suitable material.

Figure 8:
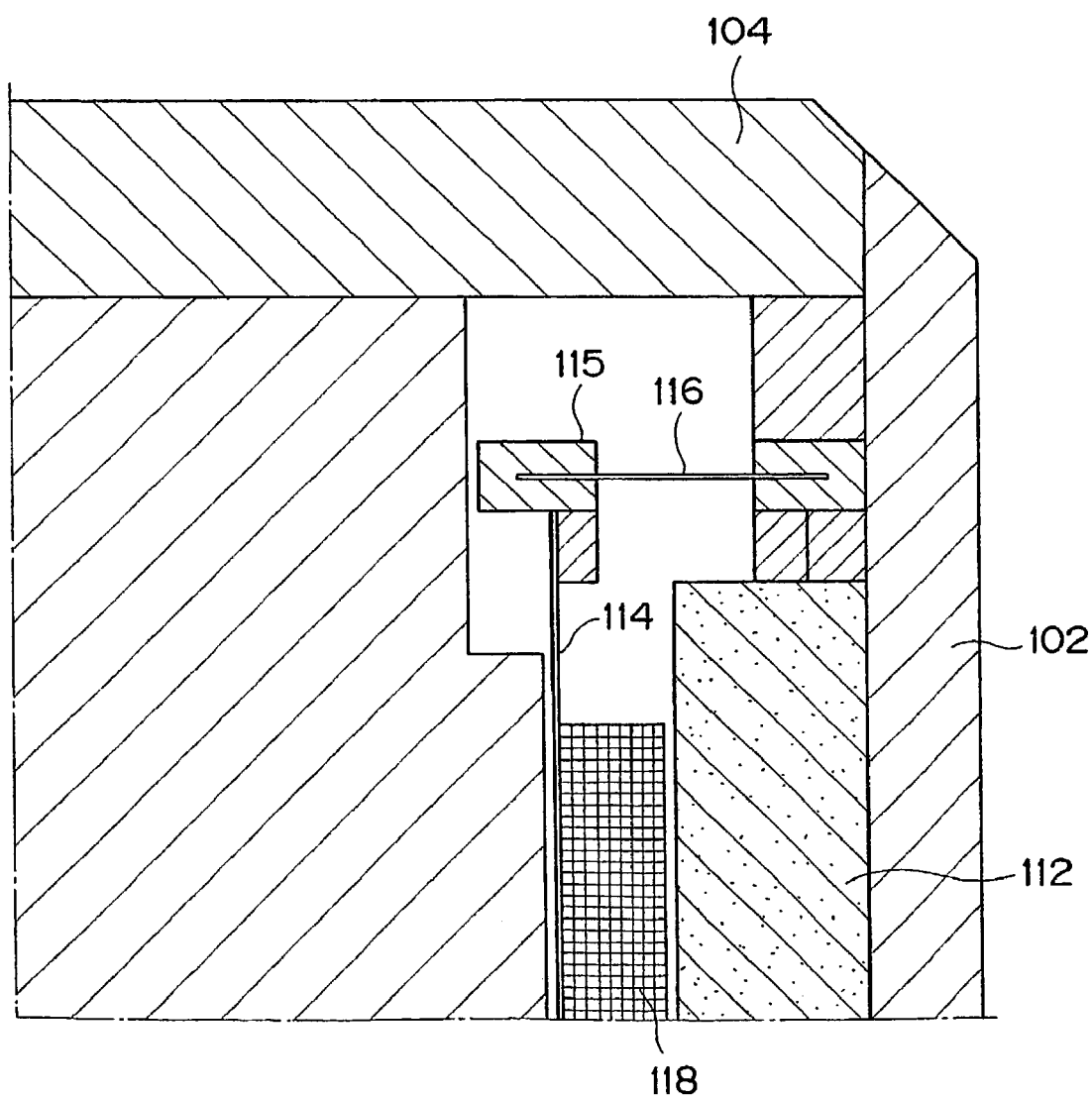
FIG. 8 shows a detailed view of the spring mounting for the coil.

A tubular bobbin 114 is positioned around the pole piece 110 and secured to the ends of the magnet 112 by means of springs 116. The springs 116 allow freedom of movement of the bobbin 114 in the axial direction but locate it relatively securely in the radial direction. FIG. 8 shows a detailed view of the manner in which the spring 116 is connected to the bobbin 114 and magnet 112. The spring 116 itself is a circular spring, examples of which are shown in U.S. Pat. No. 4,623,991. Other spring designs can be used where appropriate. In FIG. 8, the spring 116 is attached to the bobbin 114 and magnet 112 by means of plastic spring mounts 115. These allow secure connection of the spring 116 but are durable and, in the case of the bobbin spring mount, protect the connection in the event that the end of the bobbin 114 contacts the end cap 104 in use. It is to be noted that in this arrangement, the spring 116 operates in a reversed configuration to the prior art arrangements. In the prior art, the centre of the spring is fixed and the outer part deflects. In this case, the outer part is fixed and the inner part deflects.

A coil 118 is wound around the outer surface of the bobbin 114 and so is likewise moveable relative to the housing 102 and magnet 112. Various arrangements of magnet and coil are shown in FIGS. 7a–c. In FIG. 7a, the magnet is mounted in a recess formed in the housing wall and the axial extent of the coil is less than that of the magnet (i.e. the magnet extends beyond the ends of the coil. Alternatively, the coil can extend beyond the ends of the magnet as shown in FIGS. 7b and 7c. In FIG. 7c, the magnet is mounted directly on the inner surface of the housing.

Electric terminals 120, 122 are provided at either end of the magnet 112 an lead to the outside of the geophone via ports 124, 126 in the pole piece 110 and end cap 104.

Figure 3:
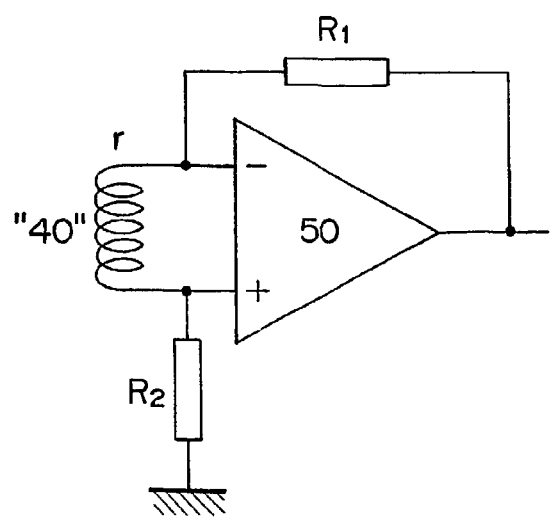
FIG. 3 shows an electronic circuit for modifying the frequency response of a geophone.
Figure 10:
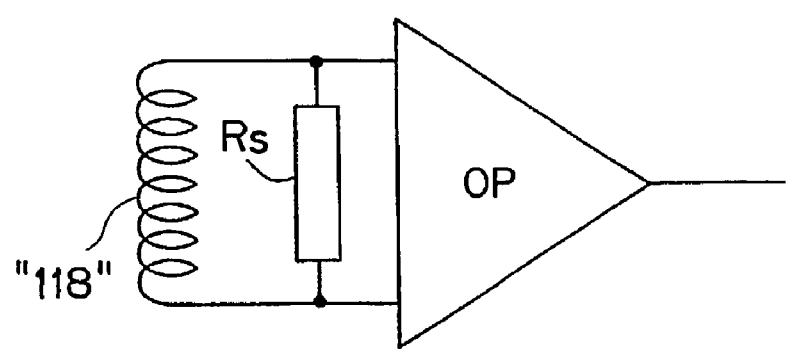
FIG. 10 shows an alternative circuit for modifying frequency response.

The output of this geophone can be modified using an op-amp circuit such as that shown in FIG. 3. Alternatively, a shunt resistor RS and op-amp OP circuit such as that shown in FIG. 10 can be connected across the coil output "118", or any other arrangement to modify the vibrational behaviour of the geophone to optimise its response at frequencies of interest.

Figure 9:
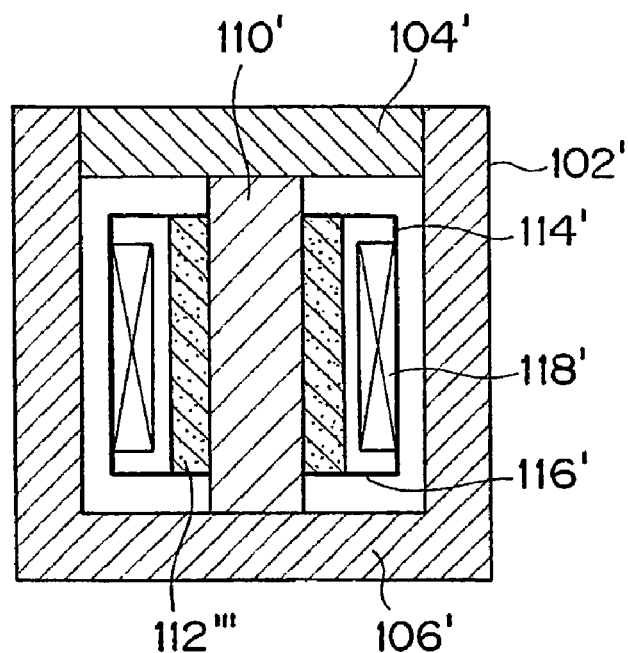
FIG. 9 shows an alternative embodiment of a geophone according to the invention.

An alternative form of geophone is shown in FIG. 9 in which the relative positions of the magnet and bobbin/coil are reversed. In this case, the magnet 112''' is secured around the center pole piece 110' and the coil 118' is wound on the the bobbin 114' which is located around the magnet 112''' by means of a spring mount 116' as before. The various optoins in construction and configuration described above in relation to the embodiment of FIG. 4 apply here also, mutatis mutandis.

Figure 1:
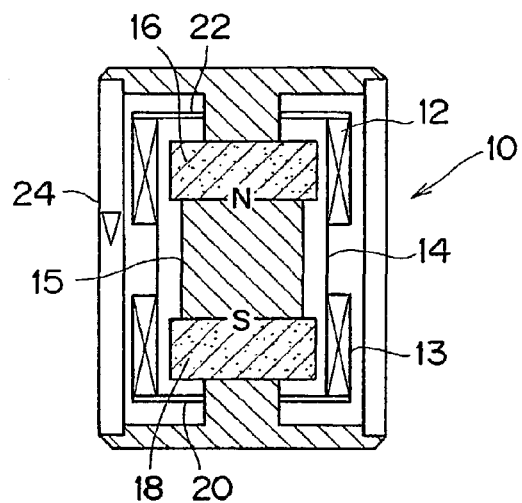
FIG. 1 shows a schematic view of a prior art geophone.
Figure 2:
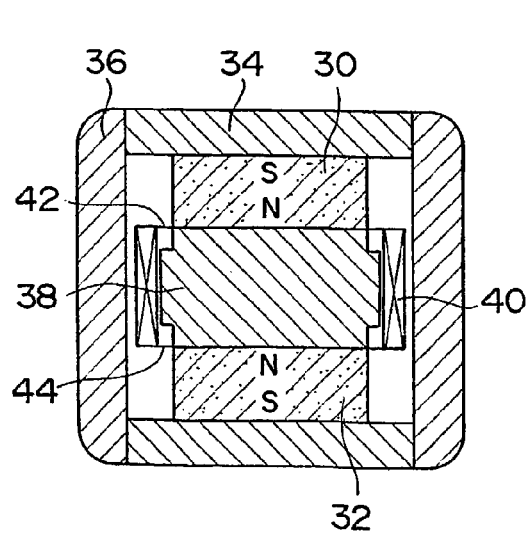
FIG. 2 shows a second prior art geophone.
Figure 11:
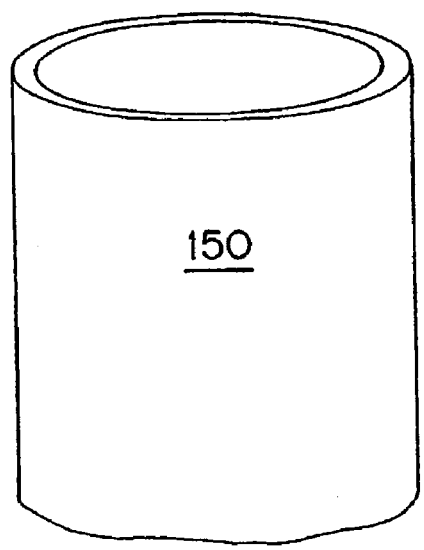
FIG. 11 shows one form of bobbin for use in a method of the invention.
Figure 12:
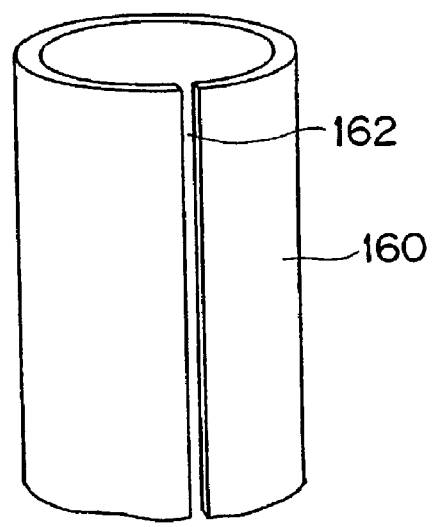
FIG. 12 shows another form of bobbin for use in a method of the invention.

A method according to the second aspect of the invention can be applied to the prior art designs of geophone shown in FIGS. 1 and 2. The mass of the bobbin carrying the coil(s) in any geophone design impacts upon its sensitivity and it is desirable to have the bobbin as light as possible. Previously, the bobbin was machined from metal making it relatively heavy, expensive and difficult to machine. For a complex design such as shown in FIG. 1, the mass might be 10 g, for a simpler design such as FIG. 2, the mass might be 4 g, both bobbins requiring machining to thicknesses of 0.1 mm in places. In the method of the present invention, the bobbin is formed from a simple tube of suitable thickness and material. For example a plastic tube 150 might be 0.15 mm thick and have a mass of about 2 g (FIG. 11). This form can be extruded or formed in any conventional manner. An alternative is to form a flat sheet into a tubular shape 160 with a slot 162 down one side (FIG. 12), in which case aluminium having a thickness of 0.1 mm might be used. One of the properties of the bobbin which affects the performance is its damping effect. Where the bobbin is a continuous metal tube, eddy currents can be set up which damp the motion of the bobbin. If the tube is incomplete (FIG. 12), eddy currents cannot be set up. The damping effect can be improved by welding the slot closed or incorporating complete metal rings or "c" rings to complete the short circuit into the bobbin.

Figure 13:
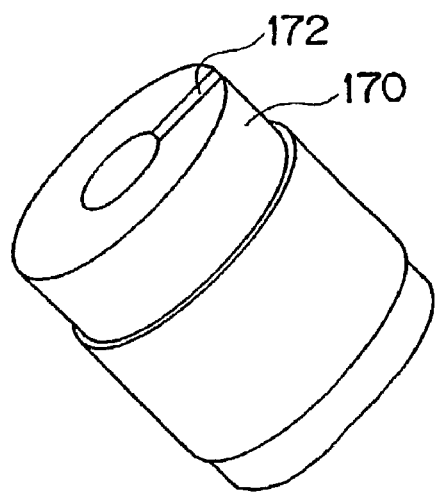
FIG. 13 shows a mandrel for use in a method of the invention.

A problem with such approaches is that the bobbins are very flexible and unable to support the operation of winding the coil(s) onto their outer surface. There are two ways in which this can be accomplished. In the first, a mandrel is inserted into the bobbin to support it while coils are wound. After winding an adhesive compound is applied to the coil(s) and once this is set, the mandrel can be removed. One form of mandrel is shown in FIG. 13 and comprises a tubular body 170 with a slit 172 cut in one side. This allows the outer diameter of the mandrel to be reduced by compressing the mandrel to close the slit. The mandrel can then be inserted into the bobbin 150 and expanded to contact is inner surface. After winding of the coils, the mandrel can again be compressed for removal.

In an alternative method, the coils are wound directly on the mandrel and the adhesive applied. Once the adhesive is set, the coils are self supporting and can be removed from the mandrel. The completed coils can then be positioned on a bobbin. For this approach a bobbin of the type shown in FIG. 12 can be used. The bobbin can be compressed to close the opening and reduce its outer diameter and allow the coils to pass over it. The proper diameter can be restored by releasing the compression and allowing the natural elasticity of the bobbin to restore its shape. Alternatively, and expanding mandrel can be used, for example of the type described above. It will be appreciated that the method is not restricted to one particular type of mandrel as long as its diameter can be changed as described.

Geophones embodying the present invention find particular applications in seismic surveying equipment. FIG. 14 shows a sea bed cable 200 which includes a number of geophone packages 202 spaced at regular intervals and connected through the cable 200 to processing equipment 204. FIG. 15 shows a land cable 200' which has essentially the same configuration as the sea bed cable with geophones 202' spaced apart and connected to processing equipment 204'.

Figure 16:
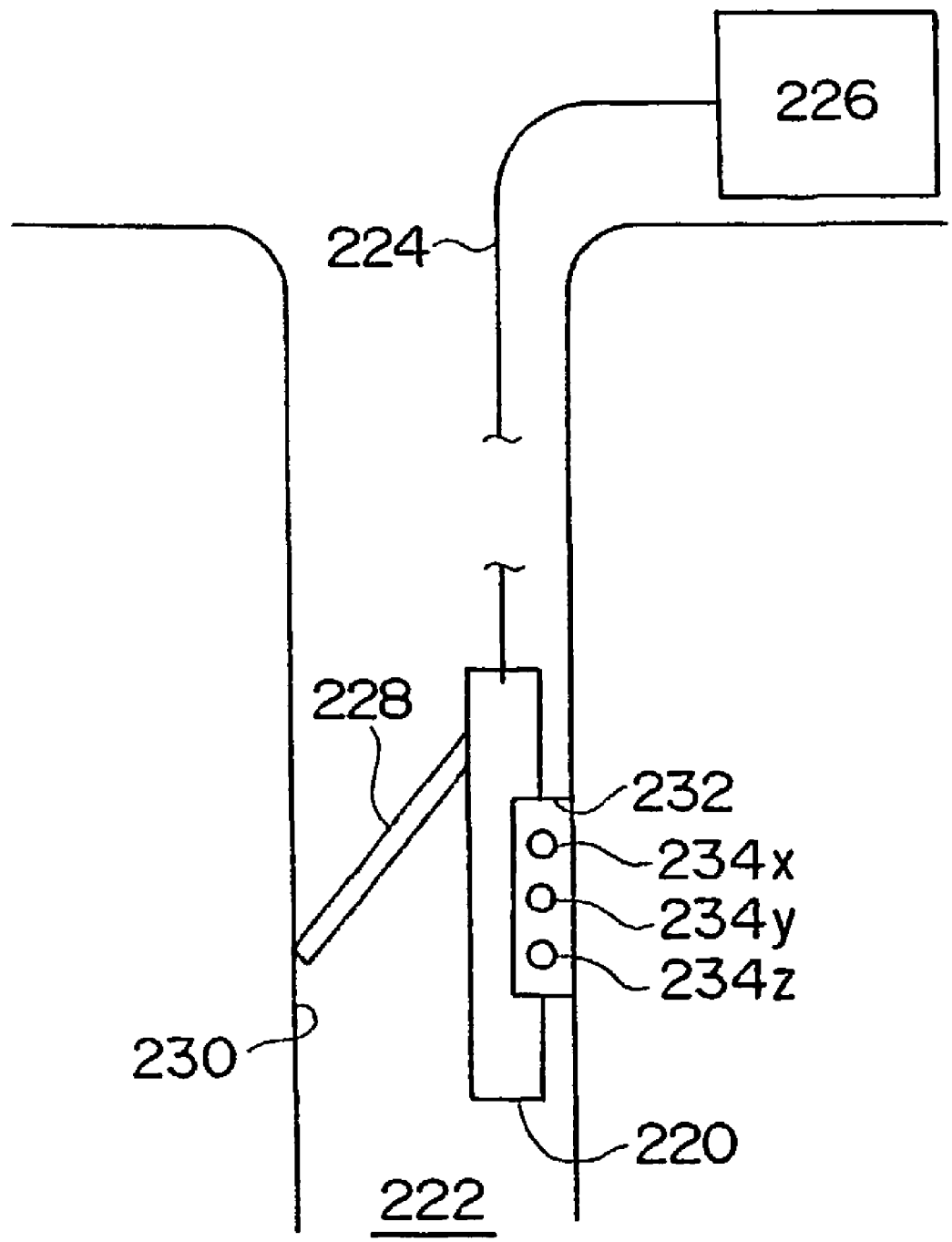
FIG. 16 shows a borehole tool.

FIG. 16 shows a borehole tool comprising a tool body 220 which can be lowered into a borehole 222 on a wireline cable 224 connected to surface processing equipment 226. The tool body 220 includes an operable arm 228 which can be caused to bear against the borehole wall 230, and a sensor package 232 which is forced against the borehole wall 230 due to the action of the arm 228. The sensor package 232 contains three orthogonally oriented geophones 234$x$, 234$y$, 234$z$ (x,y,z directions) which can receive three component seismic signals and pass data back to the surface via the wireline cable 224.

The invention claimed is:

1. A vibration transducer comprising:
   i) a central pole piece;
   ii) a magnet; and
   iii) a coil;
   wherein the magnet and the coil are concentrically arranged around the pole piece, the position of the magnet is fixed relative to the pole piece and to coil is movable relative to the magnet, and wherein the magnet is polarized in the radial direction with respect to the axis of the transducer.

2. A vibration transducer as claimed in claim 1, comprising:
   i) a housing;
   ii) a central pole piece located inside the housing;
   iii) a magnet mounted on an inner surface of the housing so as to extend around the pole piece; and iv) a coil located between the magnet and the pole piece and resiliently mounted with respect to the magnet.

3. A vibration transducer as claimed in claim 1, comprising:
   i) a housing;
   ii) a central pole piece located inside the housing;
   iii) a magnet mounted on an outer surface of the pole piece so as to extend substantially completely around the pole piece; and
   iv) a coil located between the magnet and the housing and resiliently mounted with respect to the magnet.

4. A vibration transducer as claimed in claim 2, wherein the housing comprises a wall section closed at either end by end caps so as to define a cavity.

5. A vibration transducer as claimed in claim 4, wherein the pole piece is connected to the end caps and extends through the cavity.

6. A vibration transducer as claimed in claim 2, wherein the magnet is located on the inner surface of the wall section.

7. A vibration transducer as claimed in claim 1, wherein the magnet is formed from a plurality of discrete pieces connected so as to extend substantially completely around the pole piece.

8. A vibration transducer as claimed in claim 1, wherein the magnet is single piece magnet.

9. A vibration transducer as claimed in claim 1, wherein the coil is mounted on a bobbin positioned around the pole piece.

10. A vibration transducer as claimed in claim 9, wherein the bobbin is spring mounted.

11. A vibration transducer as claimed in claim 10, wherein the bobbin is connected to the magnet by means of springs.

12. A vibration transducer as claimed in claim 1, wherein the natural frequency of the transducer is modified electronically.

13. A vibration sensor as claimed in claim 12, wherein the frequency modification is achieved by use of an operational amplifier circuit connected to a signal output of the transducer.

14. A seismic sensor comprising a transducers as claimed in claim 1 mounted in a sensor body and having signal outputs connected to a data processing system.

15. A seismic sensor as claimed in claim 14, comprising a plurality of transducers located in a cable for positioning on the earth's surface.

16. A seismic sensor as claimed in claim 15, wherein the cable is for positioning on the sea bed.

17. A seismic sensor as claimed in claim 14, wherein the sensor body comprises a tool which can be positioned in a borehole below ground surface.

18. A method of manufacturing a vibration transducer comprising:
   providing a housing having a magnet structure disposed therein and a bobbin and coil structure disposed around the magnet structure and resiliently mounted relative to the housing and magnet structure,
   wherein the magnet is polarized in the radial direction with respect to the axis of the transducer; and the bobbin is formed from a substantially tubular body which is positioned on a mandrel and at least one coil is wound around its outer surface, the mandrel being removed from the bobbin when the coil is complete.

19. A method as claimed in claim 18, wherein the bobbin is formed as a complete tube.

20. A method as claimed in claim 19, wherein the bobbin is formed from a flat sheet which is formed into a tubular shape.

21. A method as claimed in claim 18, wherein the bobbin is formed from metal or a plastics material.

22. A method as claimed in claim 18, wherein an adhesive compound is applied to the coil after winding so as to maintain its shape.

23. A method as claimed in claim 18, wherein the mandrel is reduced in diameter for insertion into and removal from the bobbin, and is expanded into contact with the bobbin prior to winding or the coil.

24. A method of manufacturing a vibration transducer comprising:
   providing a housing having a magnet structure disposed therein and a bobbin and coil structure disposed around the magnet structure and resiliently mounted relative to the housing and magnet structure,
   wherein the magnet is polarized in the radial direction with respect to the axis of the transducer; and the coil is formed separately and the bobbin is formed from a substantially tubular body which is positioned inside the coil and expanded to contact the coil when in position.

25. A method of seismic surveying which comprises providing at least one vibration transducer along a cable, connecting the cable to processing equipment, receiving signals with the at least one vibration transducer, and transmitting signals to the processing equipment via the cable, wherein the at least one vibration transducer comprises:
   i) a central pole piece;
   ii) a magnet; and
   iii) a coil;
   wherein the magnet and the coil are concentrically arranged around the pole piece, the position of the magnet is fixed relative to the pole piece and the coil is movable relative to the magnet, and wherein the magnet is polarized in the radial direction with respect to the axis of the transducer.

26. A method as claimed in claim 25, wherein the cable is a sea bed cable.

27. A method as claimed in claim 25, wherein the cable is a wireline cable deployed in a borehole.

28. A method as claimed in claim 25, wherein the received signals are 3-component seismic signals.

29. A method as claimed in claim 25, wherein three vibration transducers are provided in a triaxial orthogonal orientation.

30. A vibration transducer as claimed in claim 3, wherein the housing comprises a wall section closed at either end by end caps so as to define a cavity.

* * * * *